US008868745B1

(12) United States Patent
Muley

(10) Patent No.: US 8,868,745 B1
(45) Date of Patent: Oct. 21, 2014

(54) METHOD AND SYSTEM FOR PROVIDING CONFIGURABLE ROUTE TABLE LIMITS IN A SERVICE PROVIDER FOR MANAGING VPN RESOURCE USAGE

(75) Inventor: Praveen Muley, Billerica, MA (US)

(73) Assignee: Avaya Inc., Basking Ridge, NJ (US)

( * ) Notice: Subject to any disclaimer, the term of this patent is extended or adjusted under 35 U.S.C. 154(b) by 2021 days.

(21) Appl. No.: 10/744,529

(22) Filed: Dec. 22, 2003

(51) Int. Cl.
*G06F 15/173* (2006.01)

(52) U.S. Cl.
USPC ............................ 709/226; 709/223; 709/225

(58) Field of Classification Search
USPC .................. 370/352; 709/223–226, 238–245
See application file for complete search history.

(56) References Cited

U.S. PATENT DOCUMENTS

| | | | | |
|---|---|---|---|---|
| 6,426,955 B1 * | 7/2002 | Gossett Dalton et al. | .... | 370/401 |
| 6,539,369 B2 * | 3/2003 | Brown | ............................... | 707/1 |
| 6,856,676 B1 * | 2/2005 | Pirot et al. | ............... | 379/201.01 |
| 6,857,019 B1 * | 2/2005 | Sitaraman et al. | ............ | 709/225 |
| 6,910,067 B1 * | 6/2005 | Sitaraman et al. | ............ | 709/203 |
| 6,954,790 B2 * | 10/2005 | Forslow | ........................ | 709/227 |
| 6,985,959 B1 * | 1/2006 | Lee | ............... | 709/238 |
| 7,136,374 B1 * | 11/2006 | Kompella | ..................... | 370/352 |
| 7,197,549 B1 * | 3/2007 | Salama et al. | ................ | 709/223 |
| 7,209,473 B1 * | 4/2007 | Mohaban et al. | ............ | 370/352 |
| 7,269,348 B1 * | 9/2007 | Tse-Au | ........................... | 398/25 |
| 7,272,643 B1 * | 9/2007 | Sarkar et al. | .................. | 709/222 |
| 2002/0089985 A1 * | 7/2002 | Wahl et al. | ................. | 370/395.1 |
| 2002/0172175 A1 * | 11/2002 | Okamura | ...................... | 370/338 |
| 2002/0191541 A1 * | 12/2002 | Buchanan et al. | ............ | 370/230 |
| 2003/0088671 A1 * | 5/2003 | Klinker et al. | ................ | 709/225 |
| 2003/0182445 A1 * | 9/2003 | Smith et al. | ................... | 709/238 |
| 2003/0188018 A1 * | 10/2003 | Guerrero et al. | ............... | 709/242 |
| 2003/0229613 A1 * | 12/2003 | Zargham et al. | ................... | 707/1 |
| 2004/0088413 A1 * | 5/2004 | Bhogi et al. | .................. | 709/226 |
| 2004/0255028 A1 * | 12/2004 | Chu et al. | ....................... | 709/227 |
| 2005/0047353 A1 * | 3/2005 | Hares | ............................ | 370/255 |
| 2005/0094566 A1 * | 5/2005 | Hares | ............................ | 370/238 |
| 2006/0221971 A1 * | 10/2006 | Andrieux et al. | ............. | 370/392 |

OTHER PUBLICATIONS

Stallings; SNMP, SNMPv2, SNMPv3, and RMON 1 and 2; Addison-Wesley; copyright 1999, pp. 132-137.*
Muller; Focus on OpenView; CBM Books; © 1995.*

* cited by examiner

*Primary Examiner* — Brandon Renner
*Assistant Examiner* — Scott M Sciacca
(74) *Attorney, Agent, or Firm* — David A. Dagg

(57) ABSTRACT

A number of route tables are stored in a server at the edge of a service provider network, and are used to connect a set of customer sites to VPNs provided by the service provider. The forwarding entries in the route tables describe how packets conveyed over associated VPNs are to be forwarded between the service provider network and customer equipment systems. The disclosed system provides a configuration process for the route table including a route count limit as a parameter. The route count limit parameter provided through the configuration process is associated with the route table, and may be stored at the provider edge system, as well as at each other packet forwarding device within the network infrastructure of the service provider. Each forwarding device in the service provider infrastructure stores the route count limit, and further operates to keep track of the current number of routes inserted into the route table. Once the route table reaches the route count limit associated with it, new route requests can be either rejected, or accepted, based on a predetermined policy configuration. If new route requests are accepted, then the number of routes exceeding the route count limit is taken into account when charging the associated customer for service.

21 Claims, 4 Drawing Sheets

|  | TIME RANGE 64 | ROUTE LIMIT 66 | ALARM THRESHOLD 68 | ACCEPT/ REJECT 70 | PREFIX 71 |
|---|---|---|---|---|---|
| ENTRIES 62 | | | | | |

60
ROUTE LIMIT
POLICY RULES

OBTAIN ROUTE LIMIT POLICY — 80

↓

POPULATE POLICY RULES — 82

↓

APPLY POLICY RULES TO ROUTE TABLES — 84

METHOD AND SYSTEM FOR PROVIDING CONFIGURABLE ROUTE TABLE LIMITS IN A SERVICE PROVIDER FOR MANAGING VPN RESOURCE USAGE

FIELD OF THE INVENTION

The present invention relates generally to communication systems, and more specifically to a method and system for providing a system and method for managing the resources consumed by a Virtual Private Network (VPN).

BACKGROUND OF THE INVENTION

As it is generally known, a virtual private network (VPN) enables use of a shared or public telecommunication infrastructure, such as the Internet, to provide remote offices or individual users with secure access to an organization's network. VPNs have become a popular alternative to systems of privately owned or leased lines that can only be used by one organization. A VPN operates over the shared or public infrastructure by maintaining privacy through security procedures and tunneling protocols, such as the IPsec (IP security) protocol. By encrypting data at a sending end, and decrypting it at a receiving end, the VPN sends data through a secure "tunnel" that can only be "entered" by data that has been properly encrypted.

Today's Internet Service Providers (ISPs) provide a variety of services to individuals and companies involving access to the Internet. These services include providing VPNs traversing the Internet. Many ISP customers currently use ISP provided VPNs to minimize their internal IS (Information Services) costs. These services are called Network based VPN services. Such services may be based on either the VR (Virtual Router) model, or the BGP/MPLS (Border Gateway Protocol/MultiProtocol Label Switching) model, also referred to as the VRF model. However, a problem exists in that the current metrics for charging ISP customers for VPN services do not accurately reflect the actual utilization of ISP controlled resources. This problem is accentuated by the fact that routes carrying VPNs may be either statically defined, using a constant set of allocated resources, or dynamically defined, allocating resources on an as-needed basis. Additionally, ISP customers may desire to limit, and/or be accurately informed about, the utilization of VPN related resources, especially when charges for VPN services are tied to actual resource utilization. Moreover, both VPN customers and ISPs are interested in preventing attacks, for example by disgruntled employees, as may be performed based on flooding the ISP infrastructure with unauthorized resource requests associated with a customer's VPN.

For the above reasons and others, it would be desirable to have a new system for managing resources used by VPNs, such as VPNs provided through Network based VPN services, including VPNs based on the VR (Virtual Router) model, or the BGP/MPLS (Border Gateway Protocol/Multi-Protocol Label Switching) or VRF model. The system should accurately monitor and/or control the resources used by VPNs provided by a service provider such as an ISP. The system should further be operable to prevent attacks that are aimed at flooding a service provider network infrastructure with unauthorized resource requests.

SUMMARY OF THE INVENTION

In accordance with principles of the invention, a system for monitoring and managing resources associated with a VPN is disclosed. In the disclosed system, a number of route tables are stored in a server at the edge of a service provider network, such as an ISP network. In one embodiment, and consistent with MPLS (Multi-Protocol Label Switching) terminology, the server at the edge of the provider network, and storing the route tables, is referred to as the PE ("provider edge"). The route table in the PE is used to connect a set of customer sites to a VPN provided by the service provider. For example, the route table may be a VRF (Virtual Routing and Forwarding) route table, containing forwarding entries for a VPN associated with the VRF route table. The forwarding entries in the route table describe how packets conveyed over the associated VPN are to be forwarded between the PE and customer equipment (CE) systems. The disclosed system provides a configuration process for the route table that obtains a route count limit as a parameter. The route count limit parameter obtained through the configuration process is associated with a route table, and may be stored at the PE, as well as at each other packet forwarding devices within the network infrastructure of the service provider. Each forwarding device in the service provider infrastructure stores the route count limit, and further operates to keep track of the current number of routes inserted into the route table. In the disclosed system, the number of routes provided by a route table may, for example, be determined by the number of entries in the route table.

Once the route table reaches the route count limit associated with it, new route requests can be either rejected, or accepted, based on a predetermined policy. If new route requests are accepted, then the number of routes exceeding the route count limit is taken into account when charging an associated customer. An alarm limit can also be set, to enable generation of an alarm when the route table size reaches the alarm limit.

The disclosed system can advantageously be used to avoid over-use of service provider infrastructure resources by denying route requests after a pre-configured route count limit is reached. Moreover, the disclosed system enables a service provider to charge is customers more accurately, in terms of infrastructure resource utilization.

In a further aspect of the disclosed system, indication of a current time of day can be used to dynamically modify or vary the route count limit for a given route table. In this way, the disclosed system can further be used to allocate resources efficiently among customers working in different time zones.

In a further aspect of the disclosed system, the number of users logged into a VPN can be monitored, and excessive users blocked from logging in. Moreover, if all permitted users are logged in, then blocking further logins prevents intruders from entering the system, enhancing the security of the VPN.

Thus there is disclosed a new system for managing resources used by VPNs that accurately monitors and/or controls the resources used by VPNs in a service provider network, such as VPNs provided through Network based VPN services, including VPNs based on the VR (Virtual Router) model, or the BGP/MPLS (Border Gateway Protocol/Multi-Protocol Label Switching) or VRF model. The disclosed system is further operable to prevent attacks that are aimed at flooding a service provider network infrastructure with unauthorized resource requests. In addition, the disclosed system provides route count limits specified on a per route table basis, and is thus independent of the specific routing protocol or protocols used on the access to the network or the network trunk.

BRIEF DESCRIPTION OF THE DRAWINGS

In order to facilitate a fuller understanding of the present invention, reference is now made to the appended drawings.

DETAILED DESCRIPTION OF EXEMPLARY EMBODIMENTS

Figure 1:
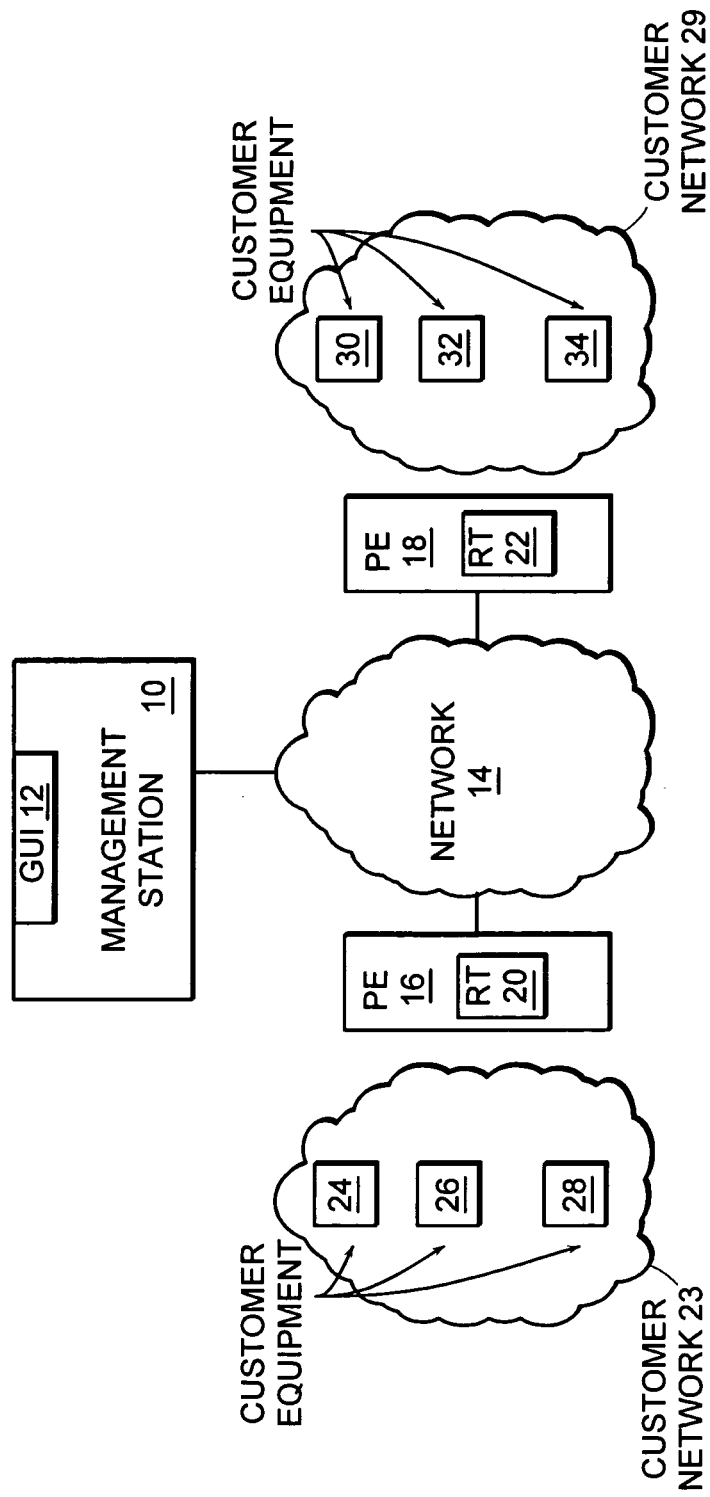
FIG. 1 is a block diagram showing an illustrative embodiment of the disclosed system.

As shown in FIG. 1, in an illustrative embodiment of the disclosed system, a management station 10 is shown providing a graphical user interface (GUI) 12 for use by a system manager. The management station 10 is communicably coupled with a service provider network 14. The service provider network 14 is further coupled to provider edge system (PE) 16 and a provider edge system (PE) 18. The PE 16 includes a route table 20, and is communicably coupled to customer equipment (CE) devices 24, 26 and 28 in a customer network 23. The PE 18 includes a route table 22, and is communicably coupled to customer equipment devices 30, 32 and 34 in a customer network 29. The customer equipment devices in the customer networks 23 and 29 each include at least one router system.

The management station 10 and customer equipment devices 24, 26, 28, 30, 32 and 34 may, for example be network enabled computer systems having one or more processors and associated memory for storing program code. The PEs 16 and 18 may, for example, be forwarding devices, such as switches or routers, operable to transfer network packets, such as Internet Protocol (IP) packets, between the network 14 and the customer equipment devices 24, 26, 28, 30, 32 and 34. The network 14 includes some number of forwarding devices, such as switches or routers, operable to convey network packets such as encapsulated IP packets, through one or more VPNs across the network 14. The route table 20 and the route table 22 are, for example, route tables associated with a VPN provided by a service provider associated with the network 14 and the PEs 16 and 18. Accordingly, the route table 22 describes how packets received from the network 14 over the VPN are to be forwarded to the customer equipment devices 24, 26, 28, 30, 32 and 34. For example, in an embodiment in which the network 14 uses MPLS to forward packets within the VPN, the route tables 20 and 22 may be VRF (Virtual Routing and Forwarding) VPN route tables.

During operation of the embodiment shown in FIG. 1, a route table entry limit configuration information is determined from a user through the GUI 12 on the management station 10, and is associated with the VPN supported by the route tables 20 and 22. As events are detected that request new routes across the VPN, and accordingly require new entries for the route tables 20 and 22, the number of routes currently represented by the route tables 20 and 22 is compared to one or more route limits associated with the VPN. In the event that the route request results in one or more limits being reached, the disclosed system may operate to refuse the request, send an alarm indicating that a limit has been reached, or maintain a record of each request in excess of a limit for purposes of charging a customer associated with the VPN.

Figure 2:
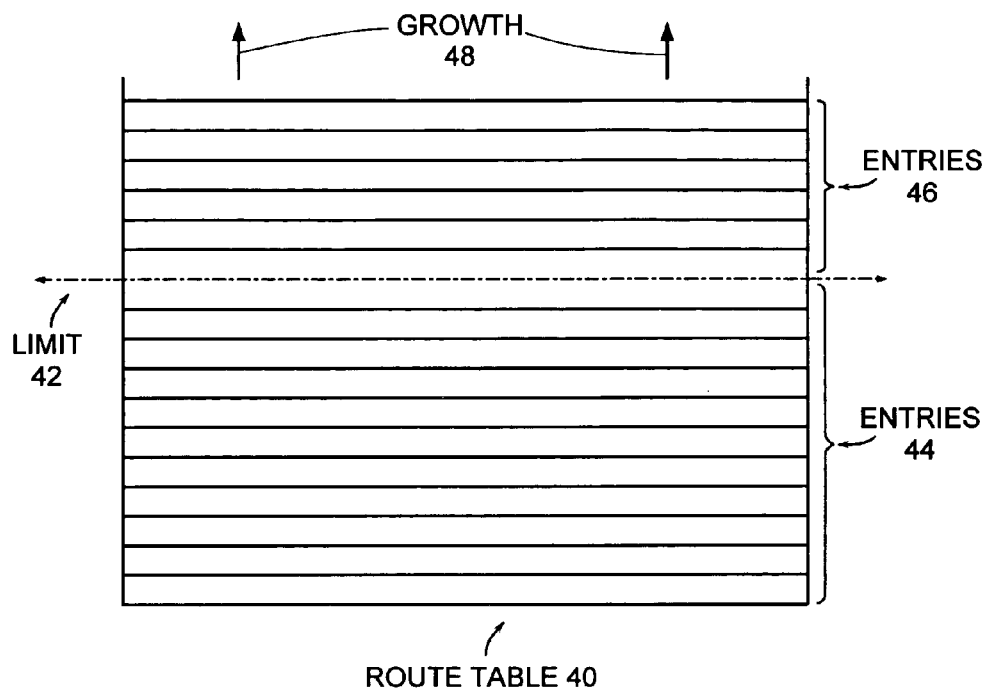
FIG. 2 is a block diagram showing a first example of a route table in accordance with a first embodiment.

FIG. 2 is a block diagram showing a first example of a route table in accordance with a first embodiment of the disclosed system. As shown in FIG. 2, a route table 40 is associated with a limit 42 reflecting a number of entries that may be added to the route table 40 before a predetermined action is performed. In the embodiment of FIG. 2, the disclosed system operates to allow routes added in excess of the limit 42. Accordingly, the entries 44 are within the limit 42, while the entries 46 are above the limit 46. Growth of the table 40 is further permitted in the direction 48 shown in FIG. 2. The number of entries 46 above limit 42 represent routes in excess of a route limit for a VPN associated with the route table 40. The disclosed system may operate to maintain a count of the entries in excess of the limit 42, for the purpose of charging a customer associated with the VPN for the route table 40 an amount based on the number of routes in excess of the limit 42. Accordingly, the route table 40 illustrates operation of an embodiment of the disclosed system in which a policy allows routes to be added to a route table in excess of a route table entry limit.

Figure 3:
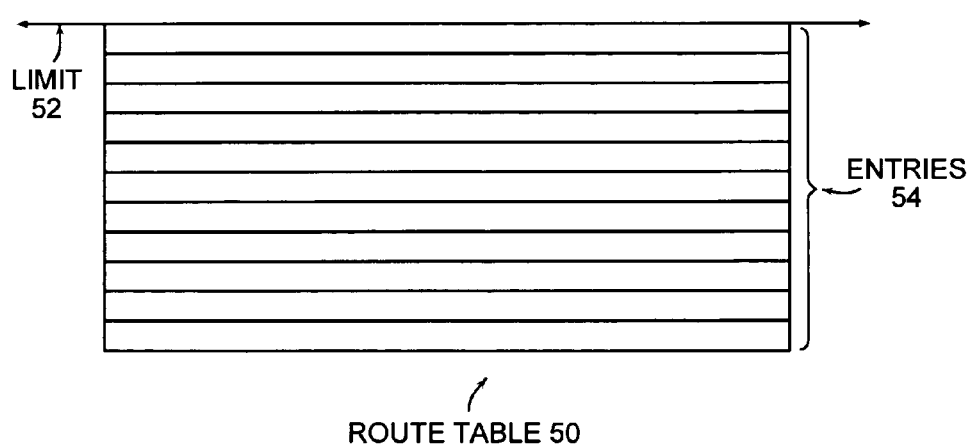
FIG. 3 is a block diagram showing a second example of a route table in accordance with a second embodiment.

FIG. 3 is a block diagram showing a second example of a route table in accordance with a second embodiment, in which a policy disallows routes to be added to a route table in excess of a route table entry limit. As shown in FIG. 3, the route table 50 includes entries 54 up to a limit 52. Since the policy for the embodiment of FIG. 3 indicates that route requests beyond the limit 52 are to be refused, no further route table entries can be added to the route table 50.

Figures 4, 5:
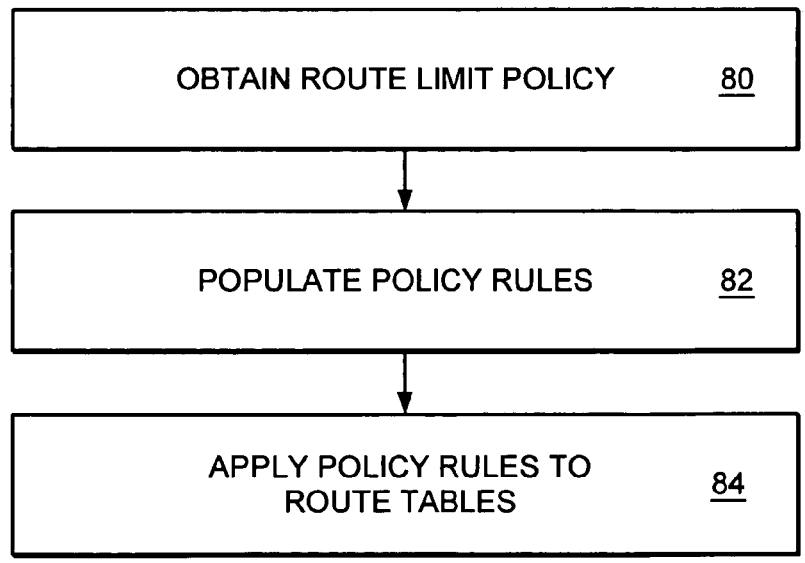
FIG. 4 shows an illustrative embodiment of entries in a route table configuration table.
FIG. 5 is a flow chart showing steps performed in an embodiment of the disclosed system establish a route count limit.

FIG. 4 shows an illustrative embodiment of entries in a route table configuration table, shown as the route limit policy rules 60. The entries 62 of the route limit policy rules 60 each include a time range 64, route limit 66, alarm threshold 68, accept/reject field 70, and prefix field 71. Each of the entries 62 is associated with a VPN offered to an associated customer of a service provider. The route limit policy rules 60 may be stored within the management station 10, or another system or systems under control of the service provider, and reflect policy information determined from a user of the GUI 12 on the management station 10. The contents of the time range field 64 indicates a time period during which the entry is valid. Accordingly, a first entry may be used to define policy values for a VPN during a first time period, whereas one or more additional entries may be used to store policy values of the VPN for use during other time periods.

The value of the route limit field 66 in one of the entries 62 indicates the number of routes or entries allowed for the associated VPN before the primary limit for that VPN is reached. The value of the alarm threshold field 68 indicates a threshold, if any, that when reached or exceeded for an associated VPN causes an alarm to be thrown. Such an alarm may, for example, consist of incrementing a counter, sending an email message, or some other appropriate indication. The accept/reject field 70 contents for one of the entries 62 indicates whether further route requests beyond the primary route limit 66 are to be accepted or rejected.

The prefix field 71 may be used to maintain a prefix or prefix list associated with a given rule. Each prefix listed in the prefix field 71 may, for example, be an IP address prefix, such as 22.2.2.2, 24.2.2.2, etc. As a route request is received, a prefix in the route request is compared with the value or values in the prefix field 71. In the event that there is a match, the route request may be satisfied based on the parameters within the associated rule. Accordingly, the prefix or prefixes in the prefix field 71 may be specified by a network manager as a parameter to the route limit policy rules. The prefixes in a list of prefixes in the prefix field 71 could be ordered by priority. In such an embodiment, the rules in the route limit policy rules 60 may be matched to route requests from most specific to least specific matching rule. This allows reservation of some number of route table entries for some number of routes having specific, predefined prefixes. For example, a rule could be used to provide some number of specifically reserved route table entries for one or more associated prefixes, while another rule could have a wild card or "any" indication its prefix field value. The route count limit for rule associated with the predefined prefixes would be allocated first in response to route requests for those predetermined prefixes. In this way the disclosed system may operate to provide prefix specific route limit policy rules that can be used to reserve route table entries.

FIG. 5 is a flow chart showing steps performed in an exemplary embodiment of the disclosed system to establish a route count limit. At step 80, the disclosed system operates to obtain route limit policy information, for example through the GUI 12 shown in the management station 10 of FIG. 1. At step 82, the disclosed system operates to populate policy rules, such as the route limit policy rules 60 shown in FIG. 4. At step 84, the disclosed system operates to apply the policy rules populated at step 82 to route requests.

Specific policy rules may be over-written on an edge router (PE) specific basis. In this way, policy rule parameters such as time of day, alarm threshold, and parameters affecting rates charged can be different for different PEs, reflecting regional policy and/or pricing variations. Such PE specific policy rule parameters would accordingly differ from overall policy parameters for the given edge router only. Additionally, as a VPN expands, the expansion may cover different sizes of PEs, having differing sizes of routing tables. Thus there may be a relatively large routing table within one PE, and a relatively smaller routing table in another PE, within a single VPN. Under such circumstances, the disclosed system advantageously operates to accommodate different route count policies for different PEs. The routers supporting big routers will have to summarize routes to the small PE using summary route or route aggregation methods. Thus it is possible to have different route table size at different PEs within a VPN. Relatively larger routers operate to summarize routes to the relatively smaller PEs using summary route or route aggregation methods.

Additionally, when there is a change in routing policy that results in a change in the route count limit, provider edge systems should be alerted. Moreover, the disclosed system may be embodied to maintain a rejected route request list to keep track of requested routes that were previously rejected. The disclosed system may then operate to go back and accept route requests that were most recently rejected in the event that the number of routes in a route table goes below a route count limit as a result of such a change in routing policy.

Figure 6:
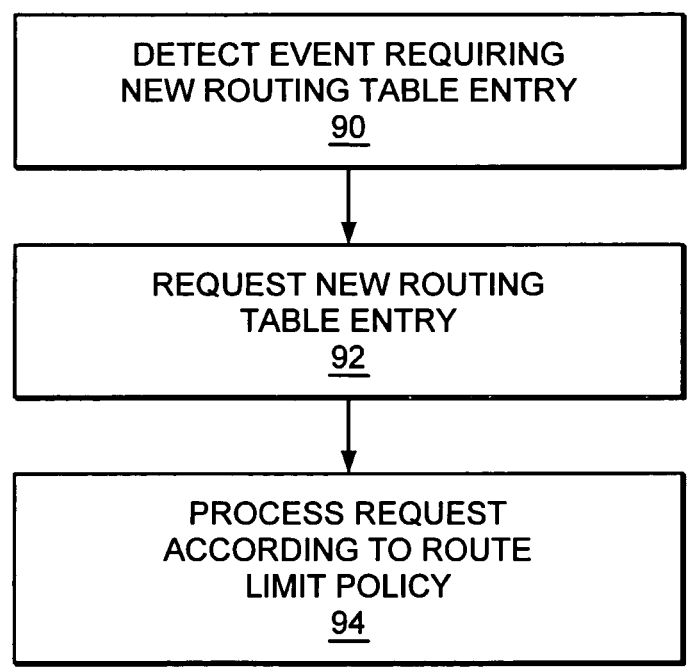
FIG. 6 is a flow chart showing steps performed in an embodiment of the disclosed system to enforce a previously defined route count limit.

FIG. 6 is a flow chart showing steps performed in an embodiment of the disclosed system to enforce a previously defined route count limit. At step 90, the disclosed system operates to detect an event requiring a new route table entry. For example, DHCP (Dynamic Host Configuration Protocol) is an example of software that automatically assigns IP addresses to client stations logging onto a TCP/IP network. A DHCP request associated with a customer equipment device may accordingly result in a request for a new route associated with a VPN provided by the service provider controlling the network 14 in FIG. 1. The resulting request for a new route table entry at 92 is followed by application of the route limit policies predetermined for the associated VPN. For example, the policy components stored in the route limit policy rules 60 may be used at step 94 of FIG. 6. Accordingly, if a primary limit for the associated VPN has been reached, then at step 94 the disclosed system may operate to either deny the route request. Alternatively, the disclosed system may allow the route request, and maintain a record of the number of routes in the VPN that exceed the route limit for purposes of billing an associated customer. Similarly, if an alarm limit associated with the VPN has been reached, then a predetermined type of alarm may be issued. Moreover, the specific limits applied to the VPN may be time dependent, and vary depending on the time the route request is processed. Accordingly, to process a route request, the disclosed system may operate to determine a current time and compare the current time to one or more time ranges defined in association with the relevant VPN, in order to determine the specific policy parameters, such as route count limits, to apply to a given route request.

FIGS. 5-6 are flowchart illustrations of methods, apparatus (systems) and computer program products according to an embodiment of the invention. It will be understood that each block of the flowchart illustration, and combinations of blocks in the flowchart illustration, can be implemented by computer program instructions. These computer program instructions may be loaded onto a computer having one or more processors, or other programmable data processing apparatus, to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem. In addition, while the invention may be embodied in computer software, the functions necessary to implement the invention may alternatively be embodied in part or in whole using hardware components such as Application Specific Integrated Circuits or other hardware, or some combination of hardware components and software.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative data structures, one skilled in the art will recognize that the system may be embodied using a variety of specific data structures. Accordingly, the invention should not be viewed as limited except by the scope and spirit of the appended claims.

I claim:

1. A method for managing resources associated with a virtual private network, comprising:
    receiving a request for a new route across said virtual private network, said request for said new route generated in response to assignment of an address to a client device, wherein said request for said new route includes at least an address prefix;
    comparing said address prefix in said request for said new route to a value of a prefix field in at least one route limit policy rule;
    in response to said address prefix in said request for said new route matching a value of said prefix field in said route limit policy rule, obtaining a route count limit from said route limit policy rule;
    determining a current route count for said virtual private network by determining a current number of forwarding entries in a route table associated with said virtual private network and stored in a provider edge device;
    accepting said request for said new route in the event that adding said requested route to said current route count would not violate said route limit policy rule;
    rejecting said request for said new route in the event that adding said requested route to said current route count would violate said route limit policy rule;
    maintaining a rejected route request list of requested routes that were previously rejected;
    detecting a change in said route count limit; and
    accepting at least one of said previously rejected routes in said rejected route request list responsive to said change in said route count limit causing said current route count to go below said route count limit.

2. The method of claim 1, wherein said route limit policy rule indicates that route requests beyond said route count limit are to be rejected, and wherein said rejecting said request for said new route comprises rejecting said request for a new route in the event that said current route count for said virtual private network is at least as high as said route count limit.

3. The method of claim 1, wherein said route limit policy rule indicates that route requests beyond said route count limit are to be accepted, and wherein said accepting said request for said new route comprises accepting said request for a new route in the event that said current route count for said virtual private network is at least as high as said route count limit and incrementing a count of accepted route requests beyond said route count limit.

4. The method of claim 3, wherein said accepting said request for said new route further comprises adding a new forwarding entry to said route table associated with said virtual private network.

5. The method of claim 3, further comprising determining a customer charge for a customer associated with said virtual private network responsive, at least in part, to said count of accepted route requests beyond said route count limit.

6. The method of claim 1, wherein said route limit policy rule includes a route count alarm threshold, and wherein said accepting said request for said new route further comprises:
    determining a new current route count for said virtual private network after said new route is added;
    comparing said new current route count with said route count alarm threshold; and
    generating an alarm in the event that said new current route count is at least as high as said route count alarm threshold.

7. The method of claim 6, wherein said alarm comprises an electronic message presented to a user through a graphical user interface.

8. The method of claim 1, wherein said route limit policy rule includes a range of time, and further comprising:
    determining a current time;
    comparing said current time with said range of time; and
    wherein said accepting said request for said new route and said rejecting said request for said new route are responsive to said comparing said current time with said range of time.

9. The method of claim 1, wherein said route limit policy rule includes a first range of time and a second range of time, and further comprising:
    determining a current time;
    comparing said current time to said first range of time;
    comparing, in the event that said current time is not within said first range of time, said current time with said second range of time; and
    wherein said accepting said request for said new route and said rejecting said request for said new route are responsive to said comparing said current time with said second range of time.

10. The method of claim 1, wherein said route limit policy rule in a given provider edge system reflects one of a plurality of local policies applicable to different respective ones of a plurality of provider edge systems in said virtual private network.

11. The method of claim 1, wherein said value of said prefix field indicates that any requested prefix will match said value of said prefix field.

12. A system for managing resources associated with a virtual private network, comprising:
    at least one processor and at least one memory;
    at least one route table associated with said virtual private network and stored in said memory;
    a rejected route request list stored in said memory;
    program code stored in said memory, said program code for execution on said processor and including:
        policy processing program code operable to obtain at least one route limit policy rule for said virtual private network, wherein said route limit policy rule includes a route count limit and a prefix field, and wherein said policy processing program code is further operable to store said route limit policy rule in association with said virtual private network;
        request processing program code operable to
            receive a request for a new route associated with said virtual private network, said request for said new route generated in response to assignment of an address to a client device, wherein said request for said new route includes at least an address prefix,
            compare said address prefix in said request for said new route to a value of said prefix field in said route limit policy rule,
            in response to said address prefix in said prefix in said request for said new route matching a value of said prefix field in said route limit policy rule, obtain said route count limit from said route limit policy rule,
            determine a current route count for said virtual private network by determining a current number of forwarding entries in said route table associated with said virtual private network, accept said request for said new route by adding a new entry to said route table in the event that adding said requested route to said current route count would not violate said route limit policy rule, reject said request for said new route in the event that adding said requested route to said current route count would violate said route limit policy rule, store requested routes that were previously rejected in said rejected route request list, detect a change in said route count limit, and accept at least one of said previously rejected routes stored in said rejected route request list responsive to said change in said route count limit causing said current route count to go below said route count limit.

13. The system of claim 12, wherein said route limit policy rule indicates that route requests beyond said route count limit are to be rejected, and wherein said request processing program code is further operable to reject said request for said new route in the event that said current route count for said virtual private network is at least as high as said route count limit.

14. The system of claim 12, wherein said route limit policy rule indicates that route requests beyond said route count limit are to be accepted, and wherein said request processing program code is further operable to accept said request for said new route in the event that said current route count for said virtual private network is at least as high as said route count limit, and to increment a count of accepted route requests beyond said route count limit.

15. The system of claim 14, further comprising program code operable to determine a customer charge for a customer associated with said virtual private network responsive, at least in part, to said count of accepted route requests beyond said route count limit.

16. The system of claim 12, wherein said route limit policy rule includes a route count alarm threshold, and wherein said request processing program code further comprises:

time determining program code operable to determine a new current route count for said virtual private network after said new route is added;

comparison program code operable to compare said new current route count with said route count alarm threshold; and alarm generation program code operable to generate an alarm in the event that said new current route count is at least as high as said route count alarm threshold.

17. The system of claim 16, wherein said alarm comprises an electronic message presented to a user through a graphical user interface.

18. The system of claim 12, wherein said route limit policy rule includes a range of time, said program code further comprising:

time determining program code operable to determine a current time;

comparison program code operable to compare said current time with said range of time; and wherein said request processing program code is responsive to said means for comparing said current time with said range of time.

19. The system of claim 12, wherein said route limit policy rule includes a first range of time and a second range of time, and said program code further comprising:

time determining program code operable to determine a current time;

comparison program code operable to compare said current time to said first range of time, and to compare, in the event that said current time is not within said first range of time, said current time with said second range of time; and wherein said request processing program code is responsive to said comparison program code.

20. The system of claim 12, wherein said route limit policy rule in a given provider edge system reflects one of a plurality of local policies applicable to different respective ones of a plurality of provider edge systems in said virtual private network.

21. The system of claim 12, wherein said value of said prefix field indicates that any requested prefix will match said value of said prefix field.

* * * * *